(12) United States Patent
Giron et al.

(10) Patent No.: US 12,270,246 B2
(45) Date of Patent: Apr. 8, 2025

(54) ELECTROCHEMICAL GLAZING WITH LOW EMISSIVITY

(71) Applicant: SAGE ELECTROCHROMICS, INC., Faribault, MN (US)

(72) Inventors: Jean-Christophe Giron, Edina, MN (US); Nicolas Antoine Mercadier, Bulle (CH)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 388 days.

(21) Appl. No.: 17/452,423

(22) Filed: Oct. 27, 2021

(65) Prior Publication Data

US 2022/0136318 A1 May 5, 2022

Related U.S. Application Data

(60) Provisional application No. 63/110,321, filed on Nov. 5, 2020.

(51) Int. Cl.
| | | |
|---|---|---|
| *G02F 1/153* | (2006.01) | |
| *E06B 3/663* | (2006.01) | |
| *E06B 3/67* | (2006.01) | |
| *G02F 1/1523* | (2019.01) | |
| *E06B 3/677* | (2006.01) | |
| *G02F 1/1514* | (2019.01) | |

(52) U.S. Cl.
CPC ........ *E06B 3/6715* (2013.01); *E06B 3/66304* (2013.01); *G02F 1/1523* (2013.01); *G02F 1/153* (2013.01); *E06B 3/677* (2013.01); *G02F 2001/15145* (2019.01); *G02F 2001/1536* (2013.01); *G02F 2202/16* (2013.01)

(58) Field of Classification Search
CPC ....................................................... G02F 1/153
See application file for complete search history.

(56) References Cited

U.S. PATENT DOCUMENTS

| | | |
|---|---|---|
| RE37,446 E | 11/2001 | Miyazaki et al. |
| 8,270,059 B2 | 9/2012 | Friedman et al. |
| 8,595,994 B1 | 12/2013 | Grommesh et al. |
| 8,900,679 B2 | 12/2014 | Theios et al. |
| 10,359,681 B2 | 7/2019 | Brown |

(Continued)

FOREIGN PATENT DOCUMENTS

| | | |
|---|---|---|
| EP | 3702572 A1 | 9/2020 |
| KR | 10-2014-0006504 A | 1/2014 |

(Continued)

OTHER PUBLICATIONS

International Search Report from Application No. PCT/US2021/072048, dated Feb. 14, 2022, 2 pgs.

*Primary Examiner* — Joseph P Martinez
(74) *Attorney, Agent, or Firm* — Abel Schillinger, LLP; Robert N. Young

(57) ABSTRACT

A triple glazing unit is disclosed. The triple glazing unit can include a first pane, a second pane, a third pane between the first pane and the second pane, an electrochemical device coupled to the third pane and between the third pane and the second pane, a first cavity between the first pane and the third pane, and a second cavity between the second pane and the third pane, wherein a distance between the first pane and the third pane is greater than a distance between the second pane and the third pane.

19 Claims, 10 Drawing Sheets

(56) References Cited

U.S. PATENT DOCUMENTS

| | | | |
|---|---|---|---|
| 2013/0016417 A1 | 1/2013 | Veerasamy | |
| 2013/0278989 A1* | 10/2013 | Lam | G02F 1/157 |
| | | | 359/275 |
| 2013/0312341 A1 | 11/2013 | Gy et al. | |
| 2015/0338713 A1* | 11/2015 | Brown | B32B 17/10513 |
| | | | 359/290 |
| 2017/0102601 A1 | 4/2017 | Luten et al. | |

FOREIGN PATENT DOCUMENTS

| | | | | |
|---|---|---|---|---|
| KR | 10-2015-0137246 A | | 12/2015 | |
| KR | 20150137246 | * | 12/2015 | E06B 3/66 |

* cited by examiner

ELECTROCHEMICAL GLAZING WITH LOW EMISSIVITY

CROSS-REFERENCE TO RELATED APPLICATION(S)

This application claims priority under 35 U.S.C. § 119(e) to U.S. Provisional Application No. 63/110,321, entitled "ELECTROCHEMICAL GLAZING WITH LOW EMISSIVITY," by Jean-Christophe GIRON et al., filed Nov. 5, 2020, which is assigned to the current assignee hereof and incorporated herein by reference in its entirety.

FIELD OF THE DISCLOSURE

The present disclosure is related to low emissivity electrochemical devices and method of forming the same.

BACKGROUND

An electrochemical device can include an electrochromic stack where transparent conductive layers are used to provide electrical connections for the operation of the stack. Electrochromic (EC) devices employ materials capable of reversibly altering their optical properties following electrochemical oxidation and reduction in response to an applied potential. The optical modulation is the result of the simultaneous insertion and extraction of electrons and charge compensating ions in the electrochemical material lattice.

As EC devices are incorporated into glazing units optical and energy related properties can vary. Insulated glazing units can include a double or triple pane series separated by spacers. A triple pane electrochromic insulating unit generally includes three panes separated by two spacers. The hermetically sealed cavity between the panes can reduce thermal transfer across the gas cavity that ultimately affects the performance of the electrochromic device. To reduce the effects on the electrochromic device, the electrochromic device is generally placed on an exterior pane. Additionally, from a thermal standpoint, glazing whose transmission may be varied within at least part of the solar spectrum allows the solar heat influx into rooms that leads to excessive heating within a confined cavity, such as a room, building, airplane, ship, etc.

As such, further improvements are sought in the context of electrochemical devices triple glazing units.

Figure 1:
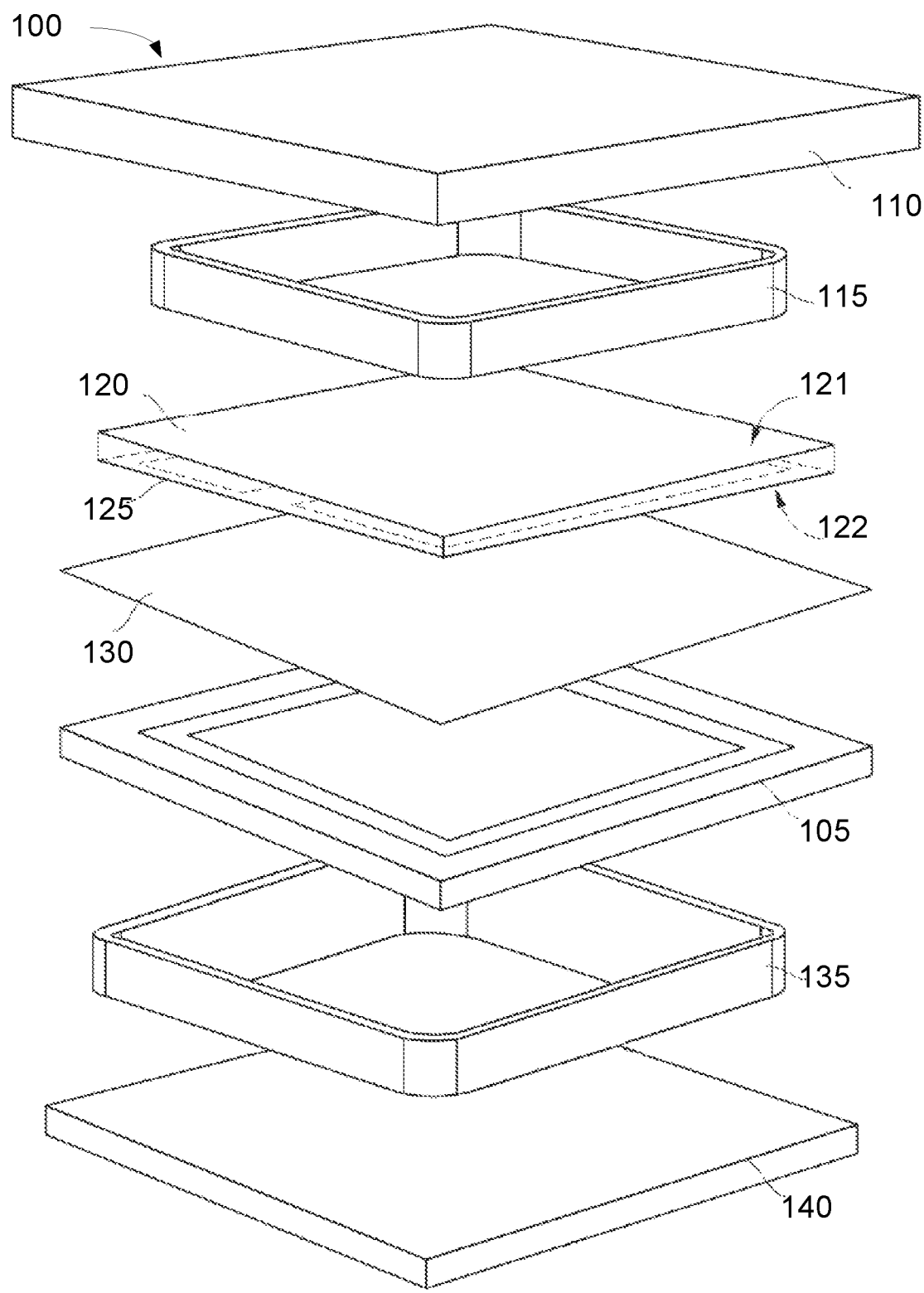
FIG. 1 is a schematic illustration of a triple glazing unit, in accordance with the present disclosure.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific embodiments and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Patterned features, which include bus bars, holes, holes, etc., can have a width, a depth or a thickness, and a length, wherein the length is greater than the width and the depth or thickness. As used in this specification, a diameter is a width for a circle, and a minor axis is a width for an ellipse.

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about", "approximately", or "substantially" is intended to mean that a value of a parameter is close to a stated value or position. However, minor differences may prevent the values or positions from being exactly as stated.

The solar heat gain coefficient (SHGC) of a glazing unit is either measured using the procedure described in the standard NFRC 201 or calculated using the process described in the standard NFRC 200 and in the EN410. The SHGC is the fraction of solar radiation admitted through a window, door, or skylight, either transmitted directly and/or absorbed, and subsequently released as heat.

A selectivity is a ratio of the TL/TE, where TL is the luminous transmission of the coated pane and TE its energetic transmission, as defined in EN410.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the glass, vapor deposition, and electrochromic arts.

FIG. 1 is a schematic illustration of an insulated glazing unit 100 according to the embodiment of the current disclosure. Any of the electrochemical devices described herein can be processed as a part of an insulated glass unit 100. The insulated glass unit 100 can include a first panel 105, an electrochemical device 120, a second panel 110, a third panel 140, a first spacer 115 and a second spacer 135. In one embodiment, the first spacer 115 can be between the first panel 905 and second panel 910. The second spacer 135 can be between the first panel 105 and the third panel 140.

The first panel 105 can be a glass panel, a sapphire panel, an aluminum oxynitride panel, or a spinel panel. In another embodiment, the first panel can include a transparent polymer, such as a polyacrylic compound, a polyalkene, a polycarbonate, a polyester, a polyether, a polyethylene, a polyimide, a polysulfone, a polysulfide, a polyurethane, a polyvinylacetate, another suitable transparent polymer, or a co-polymer of the foregoing. The first panel 105 may or may not be flexible. In a particular embodiment, the first panel 105 can be float glass or a borosilicate glass and have a thickness in a range of 2 mm to 20 mm thick. The first panel 105 can be a heat-treated, heat-strengthened, or tempered panel. In one embodiment, the electrochemical device 120 can be coupled to first panel 105. In another embodiment, the electrochemical device 120 is on a substrate 125 and the substrate 125 is coupled to the first panel 105. In one embodiment, a lamination interlayer 130 may be disposed between the first panel 105 and the electrochemical device 120. In one embodiment, the lamination interlayer 130 may be disposed between the first panel 105 and the substrate 125 containing the electrochemical device 120. The electrochemical device 120 may be on a first side 121 of the substrate 125 and the lamination interlayer 130 may be coupled to a second side 122 of the substrate 125. The first side 121 may be parallel to and opposite from the second side 122.

The second panel 110 can be a glass panel, a sapphire panel, an aluminum oxynitride panel, or a spinel panel. In another embodiment, the second panel can include a transparent polymer, such as a polyacrylic compound, a polyalkene, a polycarbonate, a polyester, a polyether, a polyethylene, a polyimide, a polysulfone, a polysulfide, a polyurethane, a polyvinylacetate, another suitable transparent polymer, or a co-polymer of the foregoing. The second panel may or may not be flexible. In a particular embodiment, the second panel 110 can be float glass or a borosilicate glass and have a thickness in a range of 5 mm to 30 mm thick. The second panel 110 can be a heat-treated, heat-strengthened, or tempered panel. In one embodiment, the first spacer 115 can be between the first panel 105 and the second panel 110. In another embodiment, the first spacer 115 is between the substrate 125 and the second panel 110. In yet another embodiment, the first spacer 115 is between the electrochemical device 120 and the second panel 110.

The third panel 140 can be a glass panel, a sapphire panel, an aluminum oxynitride panel, or a spinel panel. In another embodiment, the third panel 140 can include a transparent polymer, such as a polyacrylic compound, a polyalkene, a polycarbonate, a polyester, a polyether, a polyethylene, a polyimide, a polysulfone, a polysulfide, a polyurethane, a polyvinylacetate, another suitable transparent polymer, or a co-polymer of the foregoing. The second panel may or may not be flexible. In a particular embodiment, the third panel 140 can be float glass or a borosilicate glass and have a thickness in a range of 5 mm to 30 mm thick. The third panel 140 can be a heat-treated, heat-strengthened, or tempered panel. In one embodiment, the second spacer 135 can be between the first panel 105 and the third panel 140. In another embodiment, the second spacer 135 can be between the substrate 125 and the third panel 140. In yet another embodiment, the spacer 135 can be between the electrochemical device 120 and the third panel 135. In one embodiment, the first panel 105 may be coupled to the substrate 125 on one side and coupled to the second spacer 135 and thus spaced apart from the third panel 140 on the other side. In other words, the second spacer may be between the electrochemical device 120 and the third panel 140.

In accordance with the present disclosure, FIGS. 2A-2E each illustrates a schematic view of a triple insulated glazing unit 200 according to the embodiment of the current disclosure. For purposes of illustrative clarity, the glazing unit 200 contains an active device 260. In one embodiment, the active device 260 can be a transparent/quasi transparent photovoltaic device, or more generally an energy harvesting device. In one embodiment, the active device 260 is an electrochemical device 260. In one embodiment, the electrochemical device 260 can be a variable transmission device. In one embodiment, the electrochemical device 260 can be an electrochromic device. In one embodiment, the active device 260 is a thin film battery. In another embodiment, the active device 260 is a solid state electrochromic. In yet another embodiment, the active device 260 is a liquid crystal device that might contain dichroic dyes. The active device can also be a thermochromic or photochromic device. In one embodiment, the active device can be a sound emitting and/or sound cancelling device. However, it will be recognized that the present disclosure is similarly applicable to other types of scribed electroactive devices, electrochemical devices, as well as other electrochromic devices with different stacks or film structures (e.g., additional layers). The active device will be discussed in further detail with respect to FIG. 5.

With regard to the triple glazing unit 200 of FIGS. 2A-2E, the unit 200 may include a first pane 205, a second pane 210, a third pane 240, a first spacer 215, and a second spacer 235. In one embodiment, the first pane 205 is substantially parallel to the second pane 210 and the second pane 210 is substantially parallel to the third pane 240. The first pane 205 can be between the second pane 210 and the third pane 240. In one embodiment, the first pane 205 can be spaced apart from the second pane 210 by the first spacer 215. In another embodiment, the first pane 204 can be spaced apart from the third pane 240 by the second spacer 235.

Figure 2A:
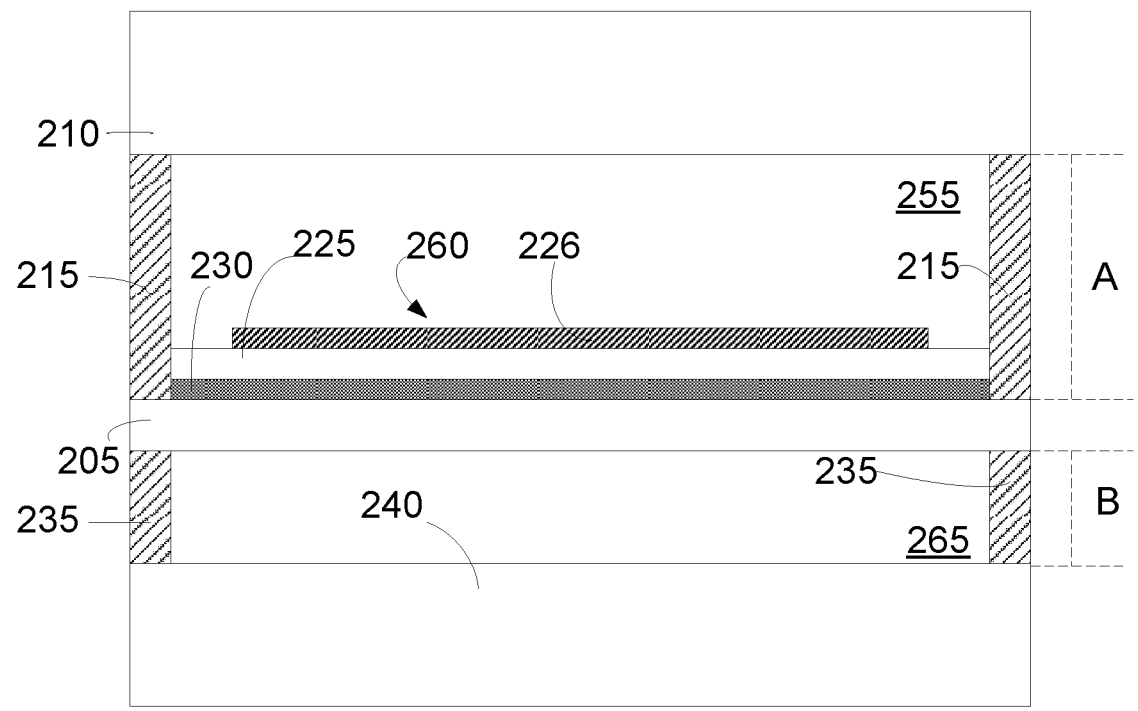
FIGS. 2A-2E each illustrate a schematic cross-section of a triple glazing unit with an improved structure in accordance with an embodiment of the present disclosure.
Figure 2B:
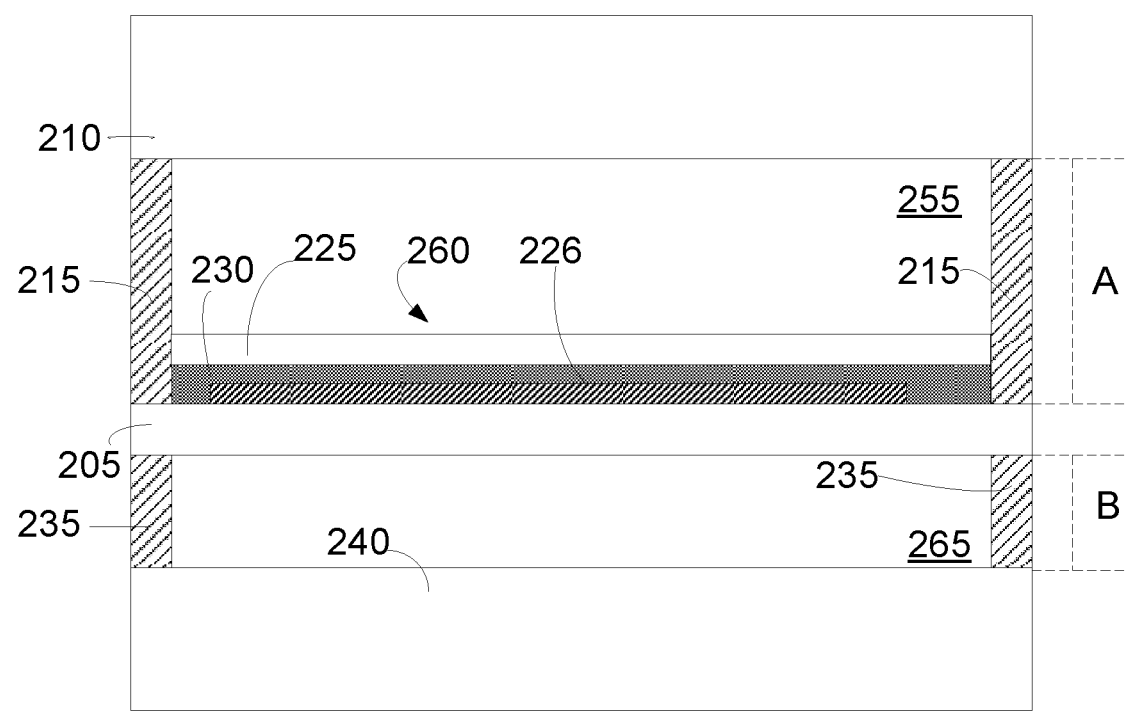
Figure 2C:
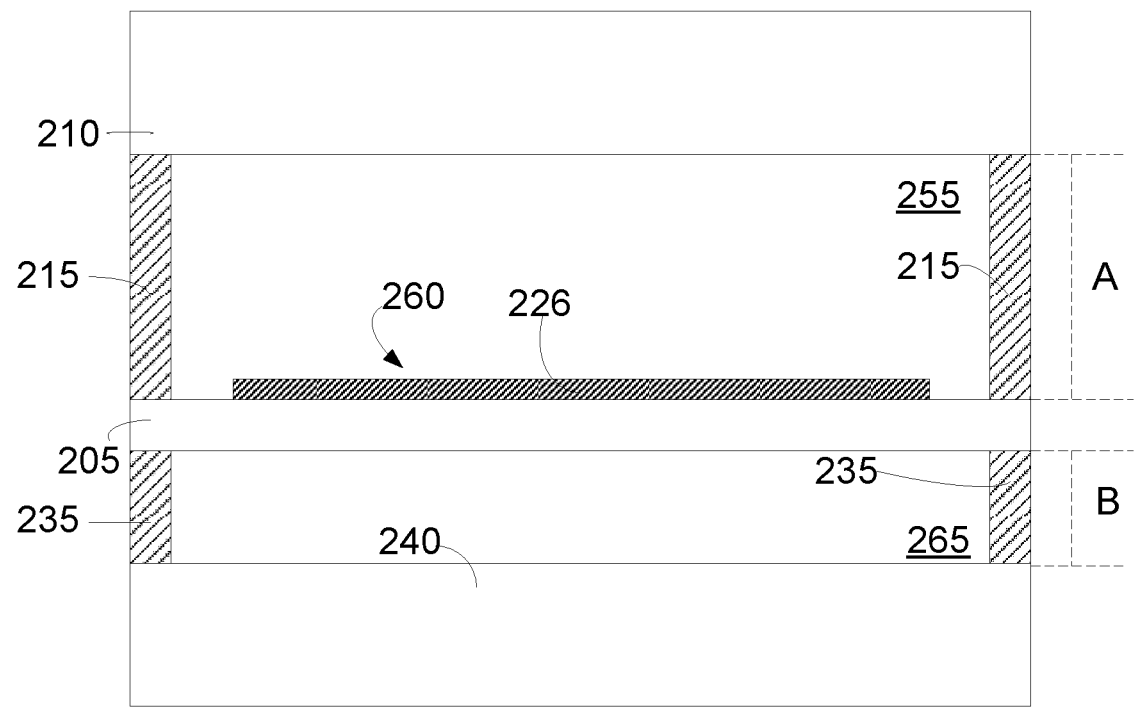
Figure 2D:
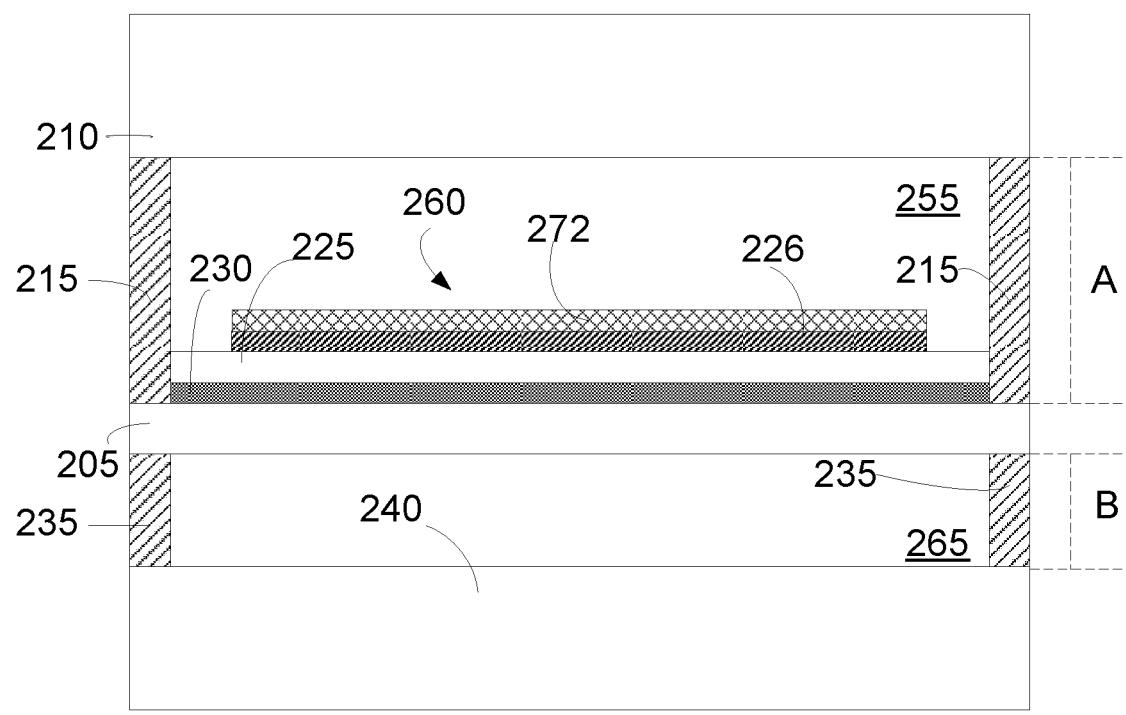
Figure 2E:
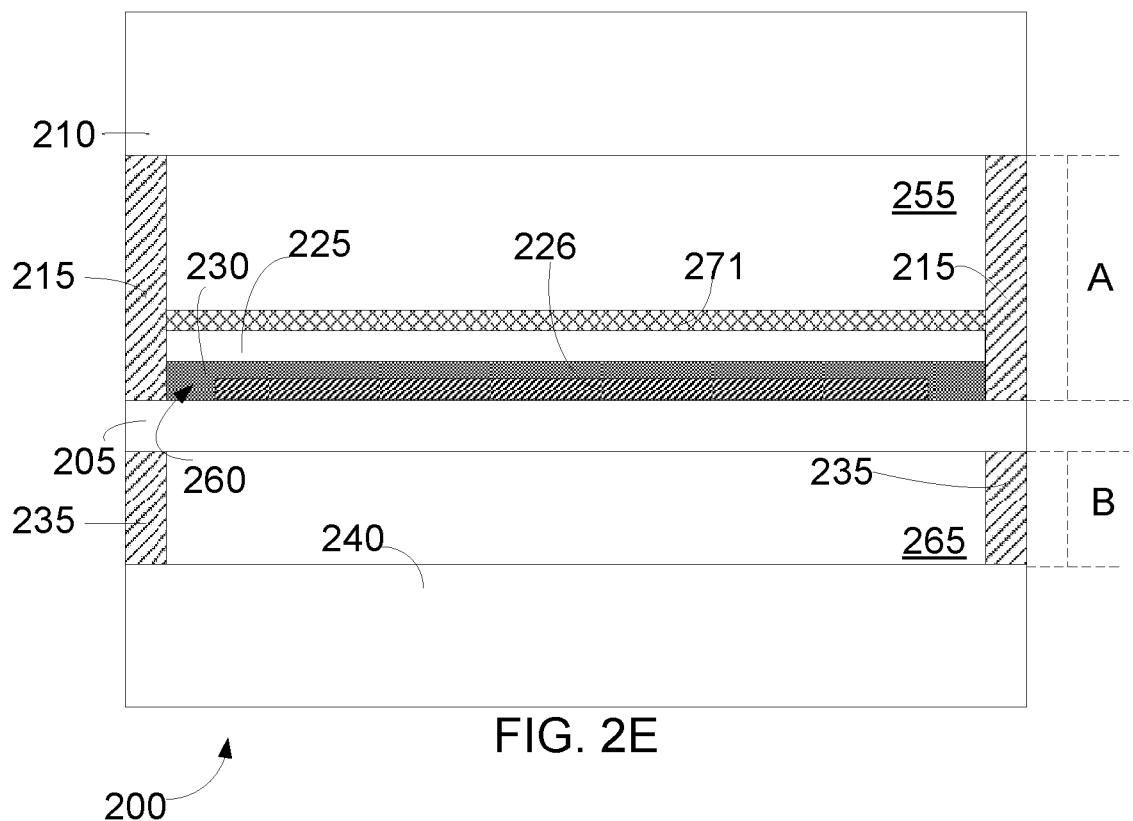

In one embodiment, an active device 260 can coupled to the first pane 205. In one embodiment, the active device 260 can be coupled to the first pane 205 with a lamination interlayer 230, as seen in FIG. 2A. In another embodiment, the active stack 226 can be between the substrate 225 and the third pane 205, as seen in FIG. 2B. In such an embodiment, the active stack 226 can be on the pane 205. Optionally, a low-e layer 271 can be on the substrate 225, as seen in FIG. 2E. In another embodiment, the active device 260 can be coupled directly to the first pane 205, as seen in FIG. 2C. As seen in FIG. 2D, the active device 260 can include a low-emissivity (low-E) layer 272. In one embodiment, the second transparent conductive layer of the active device 260 can be a low-e layer 272.

In the embodiment of FIG. 2, the active device is an electrochemical device 260. The electrochemical device 260 can include substrate 225 and electrochemical stack 226. In one embodiment, the electrochemical stack 226 can be facing the second pane 210 while the lamination interlayer 230 is between the substrate 225 and the first pane 205. In other words, in one embodiment, the substrate 225 is between the electrochemical stack 226 and the first pane 205. In one embodiment, the electrochemical device 260 can be between the first pane 205 and the second pane 210. The electrochemical device 260 will be discussed in more detail below with respect to FIG. 5.

Between the first pane 205 and the second pane 210 can be a cavity 255. Between the first pane 205 and the third pane 240 can be a cavity 265. Functionally, spaces 255, 265 between the panes 205, 240, 210 can be insulating. As such, when the exterior panes 210 and 240 are equidistance from the interior pane 205, heat within the cavity 255 and cavity 265 can get trapped and begin to heat the electrochemical device 260. Unlike the exterior panes 240 and 210 that have a side facing an exterior environment that can dissipate the heat, the interior pane 205 absorbs the trapped heat. In one embodiment, the third pane 240 can have an exterior surface that faces an exterior of a structure while the second pane 210 can have an exterior surface that faces an interior of the structure. The interior pane 205 can heat up to greater than 70° C. At such temperatures, the electrochemical device 260 coupled to the interior pane 205 begins to deteriorate or become functional inefficiently. Additionally, since heat is symmetrically evacuated towards the exterior surfaces of the exterior panes, the solar heat gain coefficient for the triple glazing unit can be high (greater than 0.5). However, the embodiment of FIG. 2 advantageously allows an electrochemical device to be coupled to the interior pane while maintain functionality and limiting the solar heat gain coefficient for the triple glazing unit.

As such, as seen in FIGS. 2A-2E, a distance A between the first pane 205 and the second pane 210 is greater than a distance B between the first pane 205 and the third pane 240. The distance A can be between 4 mm and 24 mm. In another embodiment, the distance A can be between 6 mm and 20 mm. In yet another embodiment, the distance A can be between 8 mm and 16 mm. The distance B can be between 6 mm and 30 mm. In one embodiment, the distance B can be between 8 mm and 20 mm. In yet another embodiment, the distance B can be between 12 mm and 18 mm. In one embodiment, the distance A is twice the distance B. In another embodiment, the ratio of distance A:B can be between 1:2 and 1:5. The cavity 265 can contain between 50% and 100% atmospheric air. In another embodiment, the cavity 265 can contain between 90% and 100% atmospheric air. In yet another embodiment, the cavity 265 can contain about 100% atmospheric air. The cavity 255 can contain between 10% and 20% atmospheric air and between 80% and 90% argon. In one embodiment, the cavity 255 can contain between 10% and 15% atmospheric air and between 85% and 90% argon. The triple glazing unit 200 advantageously evacuates heat from the interior pane 205 towards the outside of the triple glazing unit 200 and thus optimizes the energetic performance of the glazing unit 200, as measured by the solar heat gain coefficient.

Figure 6:
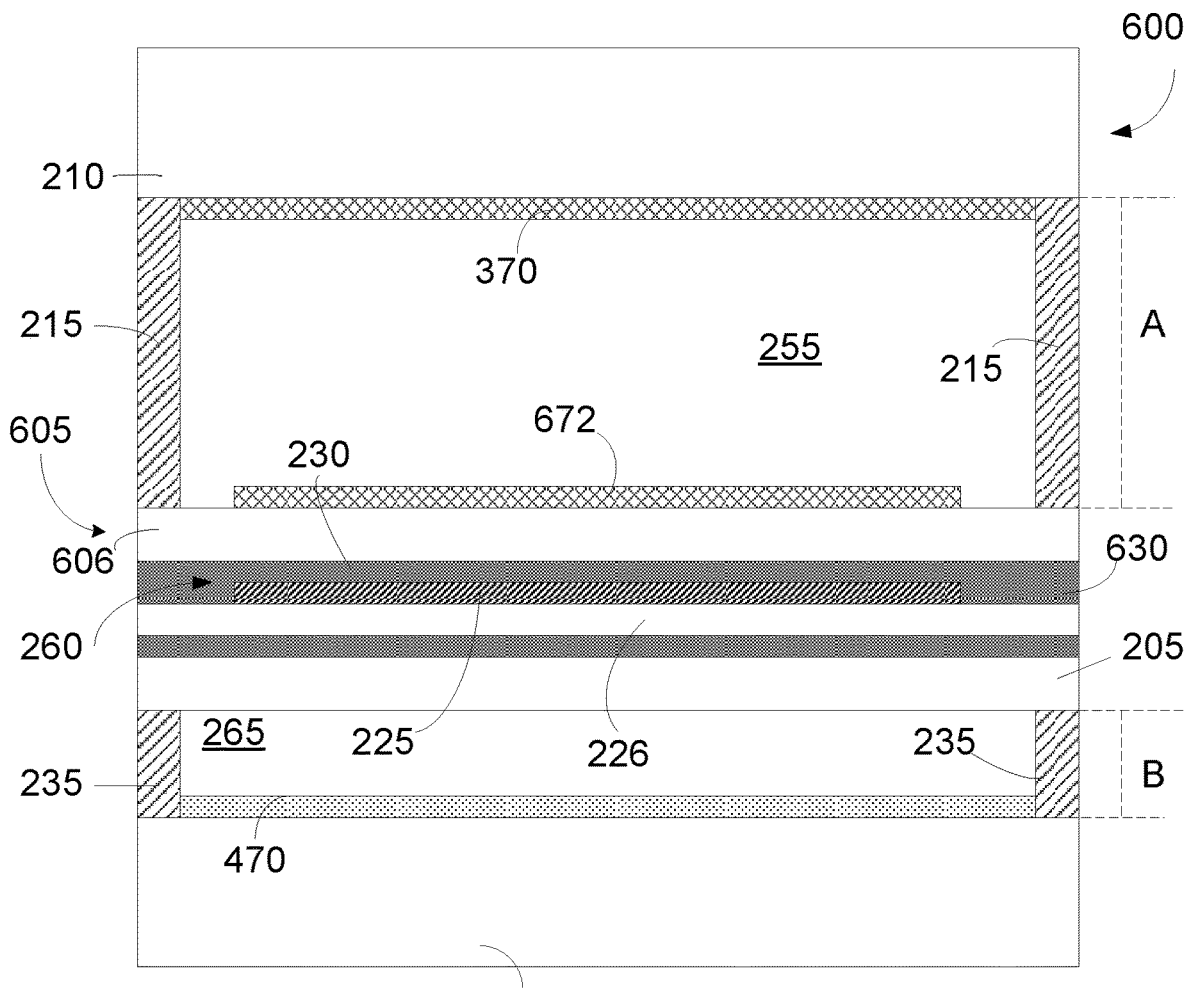
FIG. 6 illustrates a schematic view of a triple insulated glazing unit according to another embodiment of the current disclosure.

While a triple glazing unit is disclosed, it can be imagined that more than three panes can be used. In one embodiment, the interior pane 205 can contain more than one pane with the active device therein, as seen in FIG. 6. In another embodiment, the triple glazing unit 200 can first be manufactured as a double pane glazing unit and then retrofitted onto an existing pane to make a triple pane glazing unit. In another embodiment, an electrochromic can be manufactured on a single pane and then retrofitted and combined with a separate pane that is already on a structure to form a double glazing unit. A process of manufacturing a triple glazing unit can include forming a double glazing unit in one location, transferring the double glazing unit to a second location, and forming a triple glazing unit using the double glazing unit, an second spacer, and a third pane. In a separate embodiment, the double glazing unit may be made in the same location as the triple glazing unit. The double glazing unit can include a first pane, a second pane, a first spacer between the first pane and the second pane that forms a first cavity between the first pane and the second pane, and an active device coupled to the first pane and between the first pane and the second pane. In one embodiment, the first cavity comprises about 90% argon or krypton and about 10% atmospheric air. The triple glazing unit can include the double glazing unit previously formed, a third pane and a second spacer between the first pane and the third pane that forms a second cavity between the first pane and the third pane. In one embodiment the third pane is part of a window installed within a structure, such as a building, car, plane, etc. In one embodiment, the second cavity could include about 100% atmospheric air. In another embodiment, the first cavity could be open such that air can exchange with the inside of a building. In one embodiment, the second cavity can be narrower than the first cavity. The triple glazing unit that is manufactured as described above can be similar to the triple glazing unit 200 described in FIG. 2.

Figure 3A:
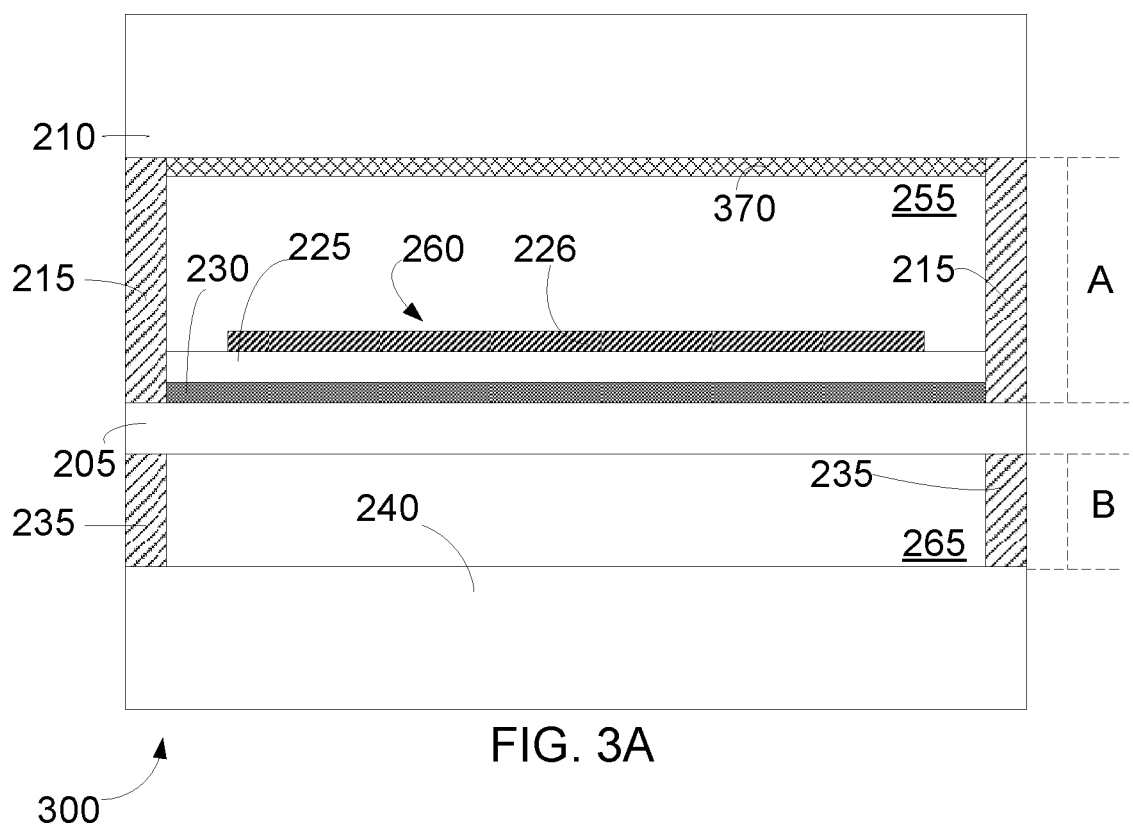
FIGS. 3A-3E each illustrate a schematic view of a triple insulated glazing unit according to another embodiment of the current disclosure.
Figure 3B:
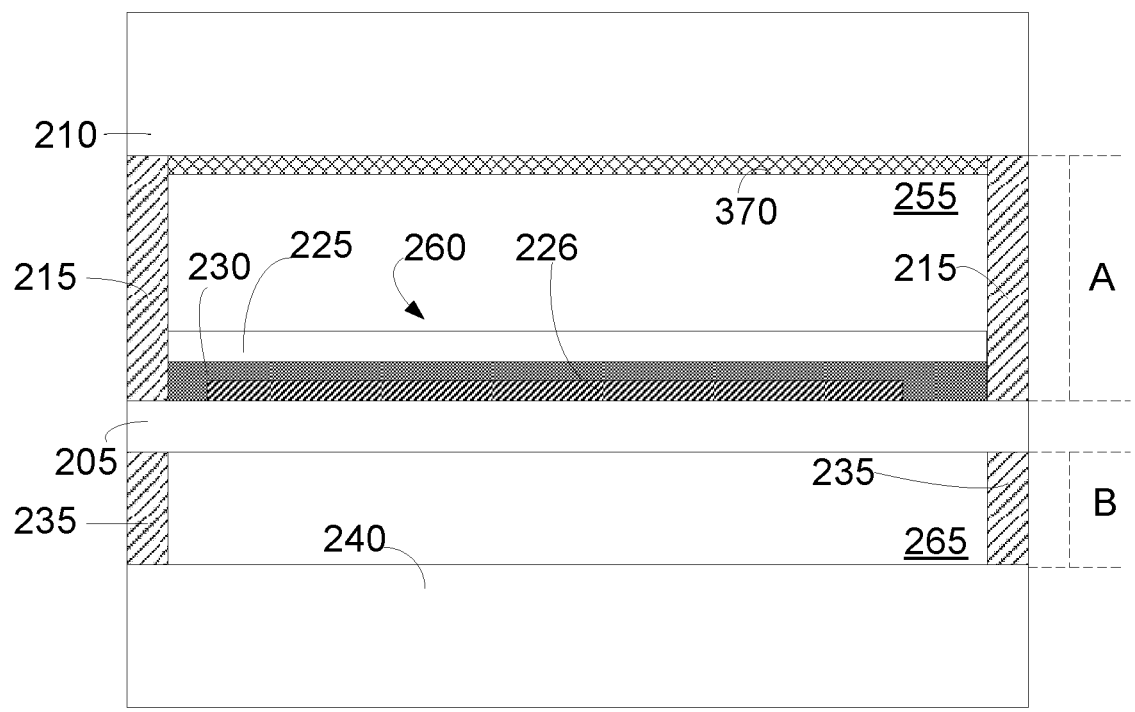
Figure 3C:
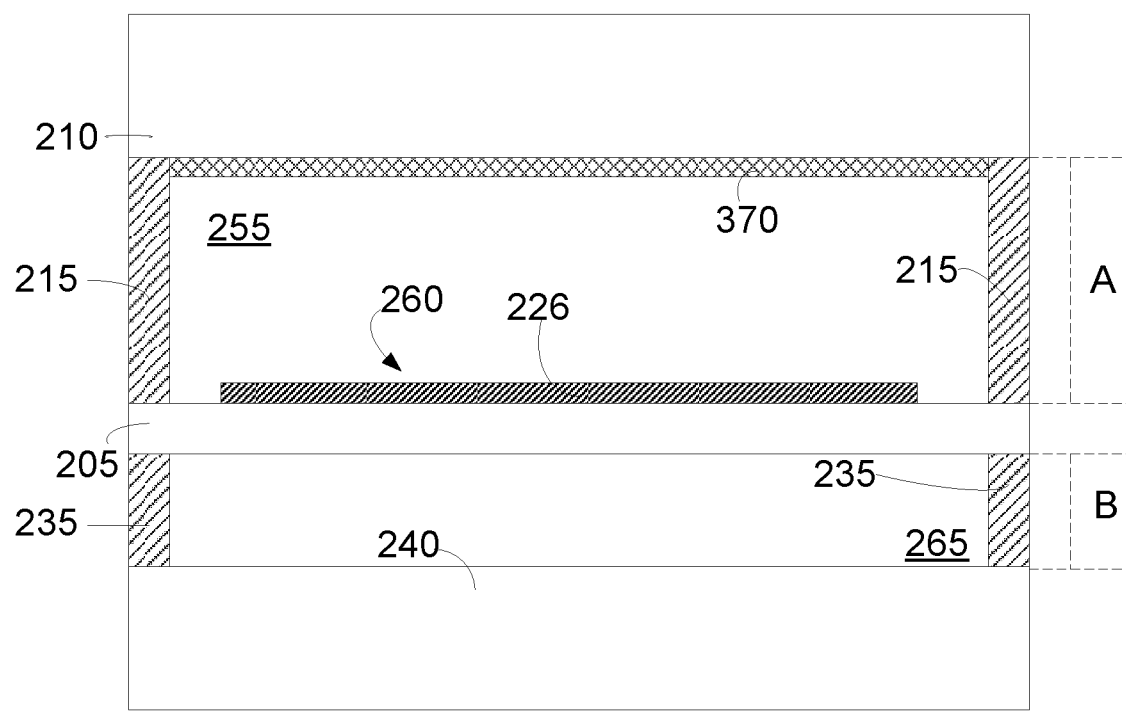
Figure 3D:
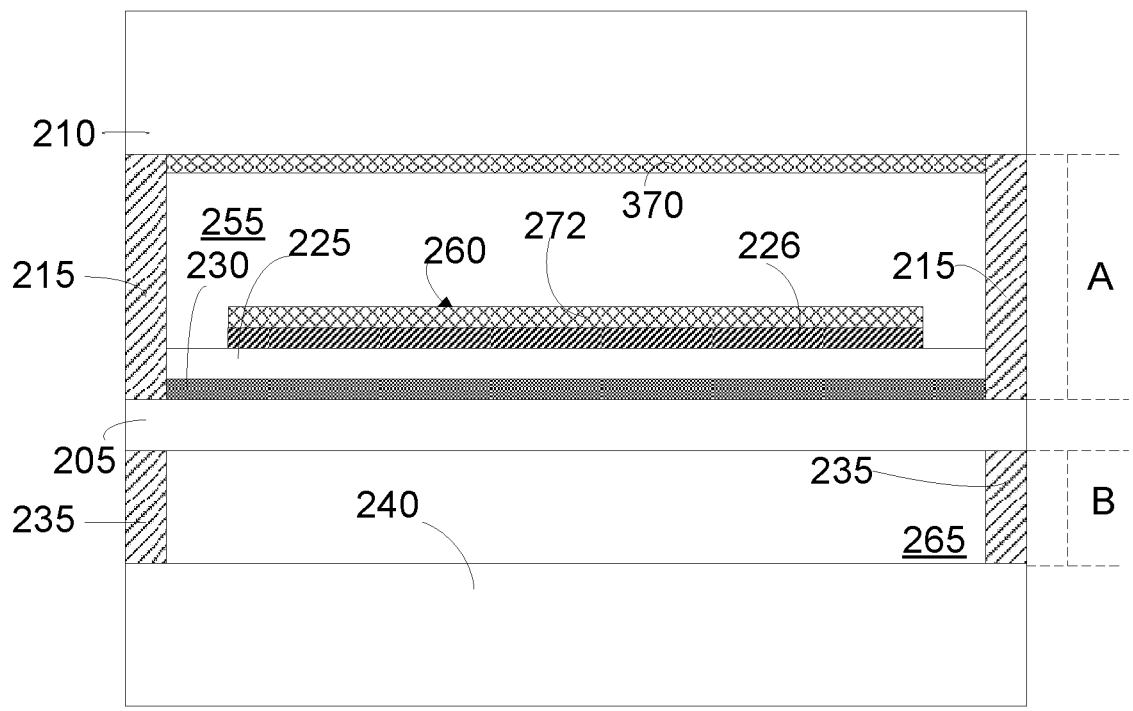
Figure 3E:
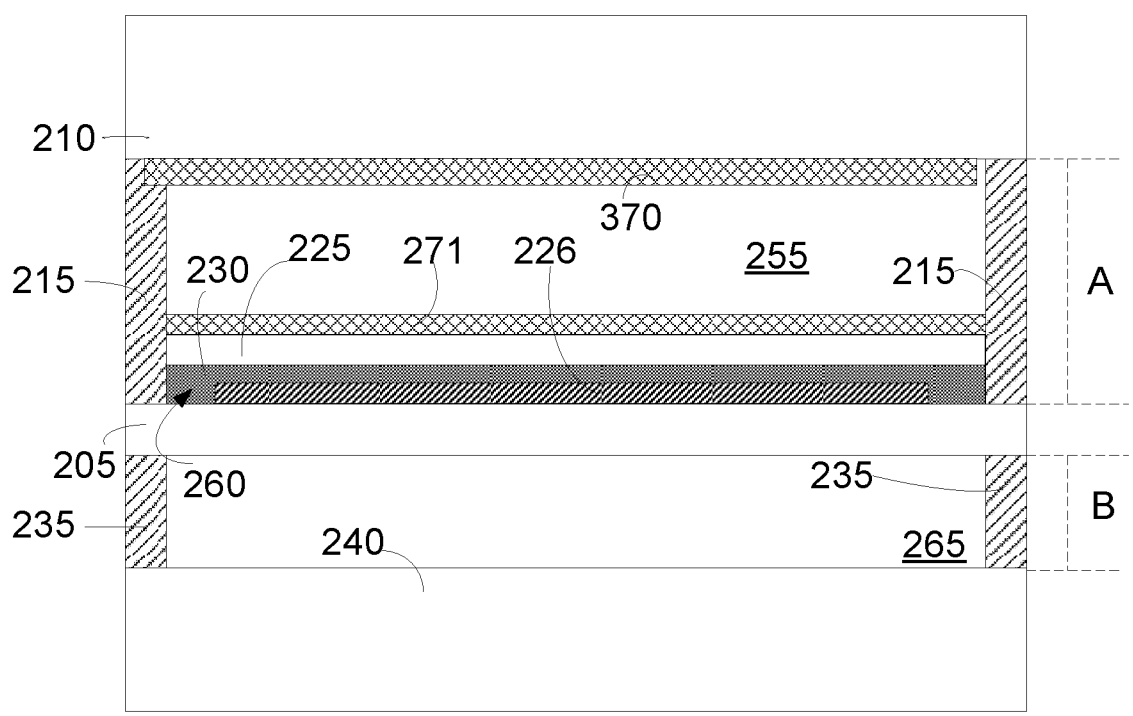
Figure 4A:
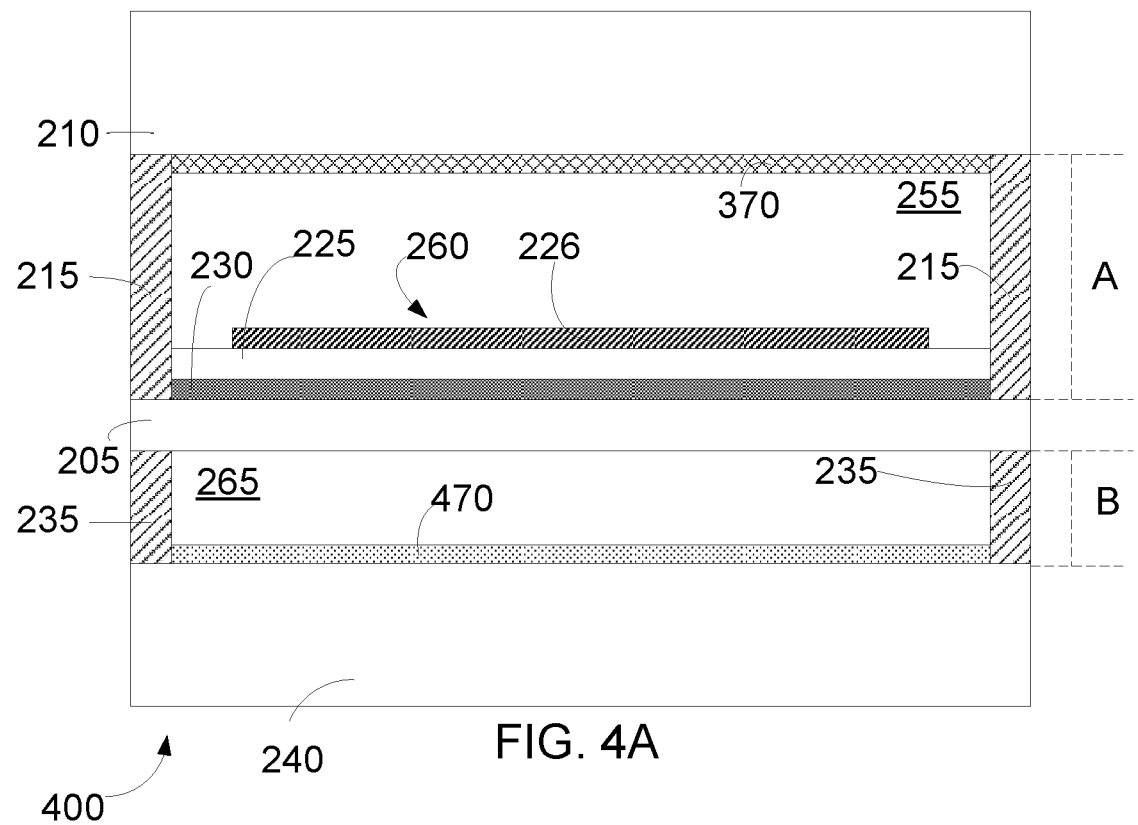
FIGS. 4A-4E each illustrate a schematic view of a triple insulated glazing unit 500 according to another embodiment of the current disclosure
Figure 4B:
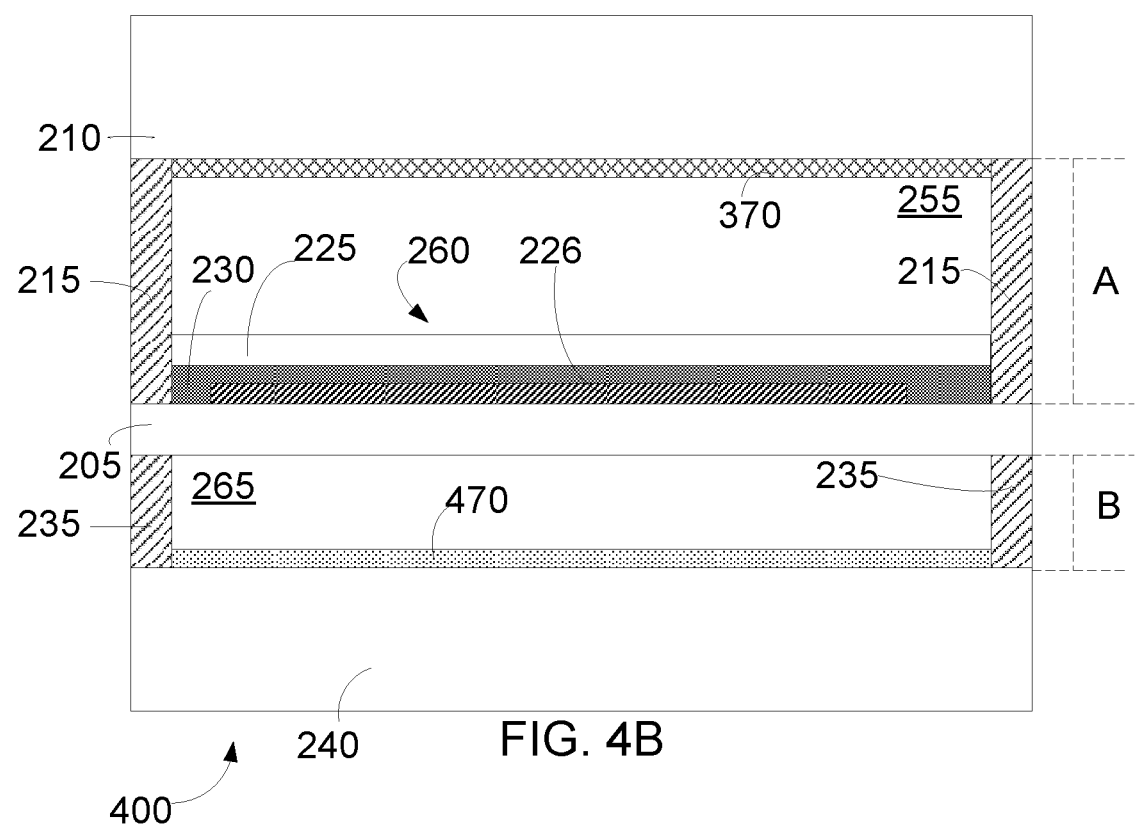
Figure 4C:
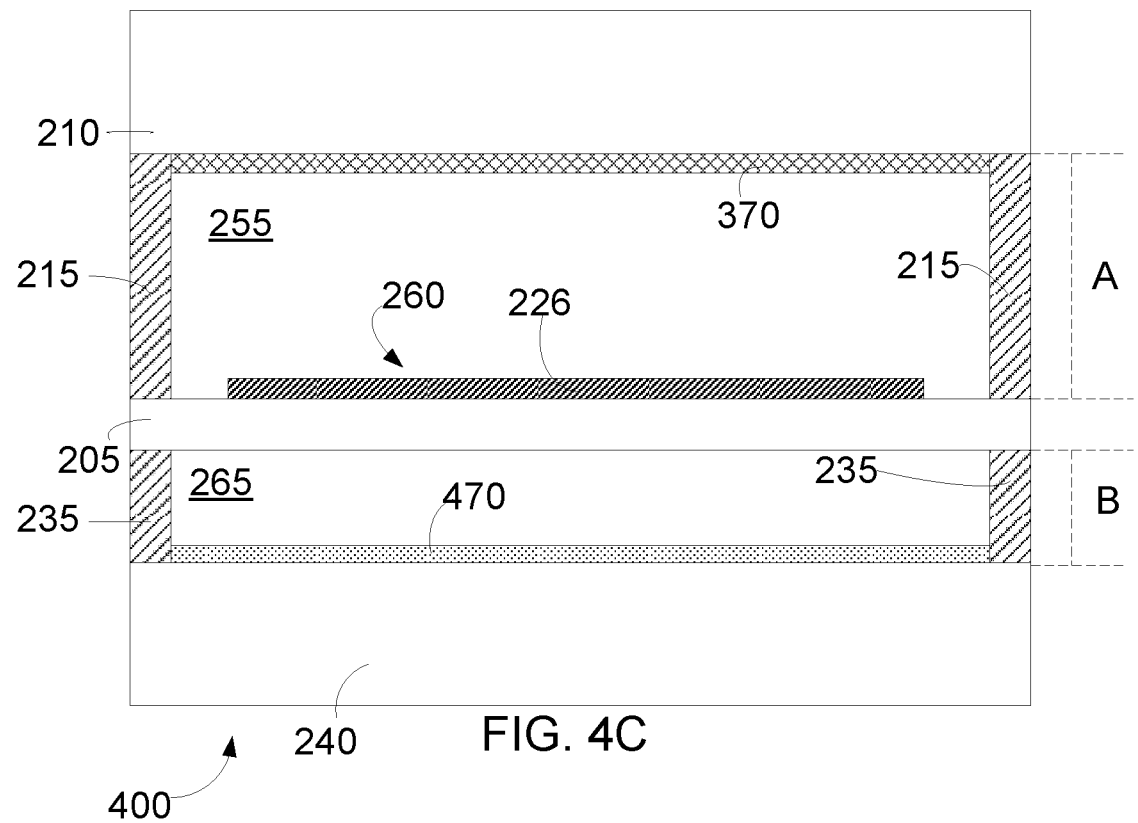
Figure 4D:
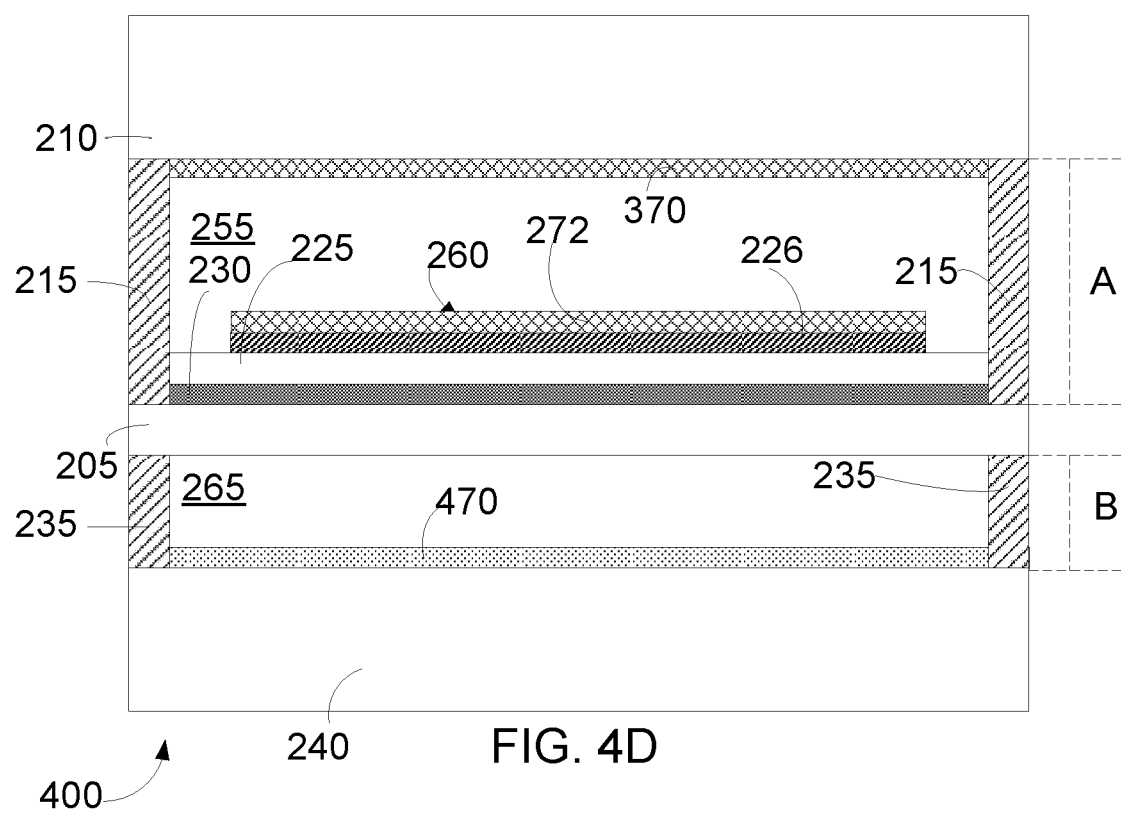
Figure 4E:
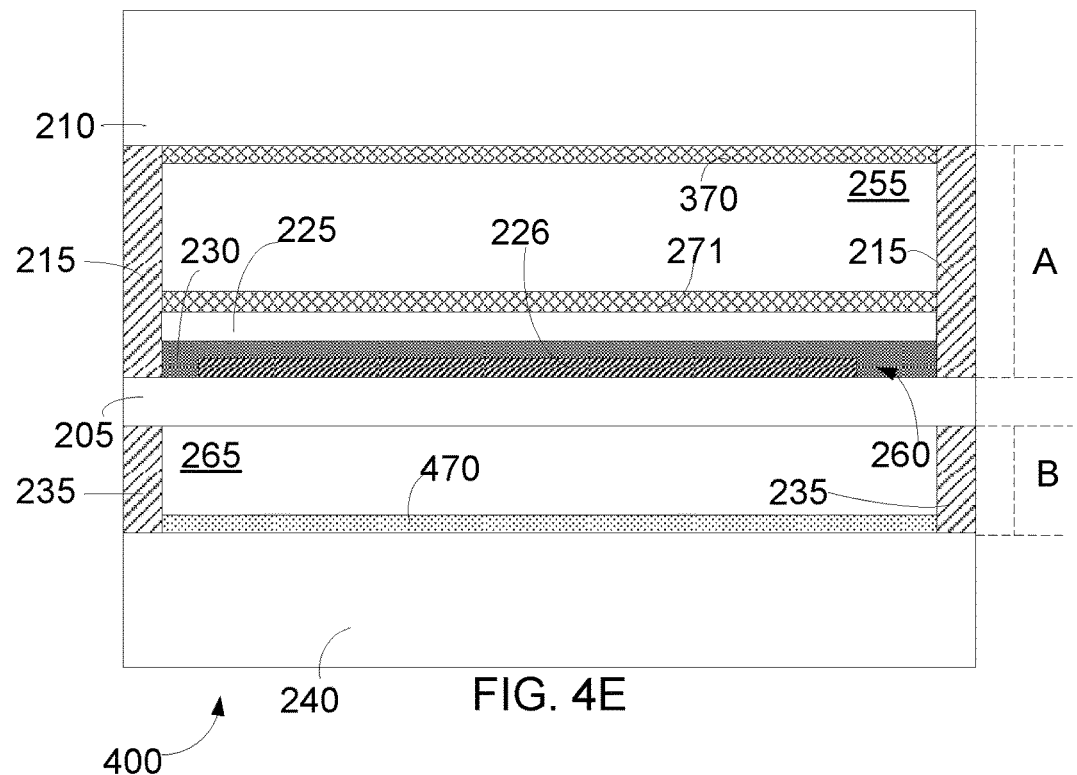

The triple glazing unit 200 can include additional layers and embodiments, such as seen in FIGS. 3A-3E. FIGS. 3A-3E each illustrate a schematic view of a triple insulated glazing unit 300 according to another embodiment of the current disclosure. The triple glazing unit 300 of FIGS. 3A-3E are substantially similar to the triple glazing unit 200 of FIGS. 2A-2E. In fact, the triple glazing unit 300 of FIGS. 3A-3E are a variant of the embodiment of FIGS. 2A-2E, in which equivalent elements have been given identical reference numbers. As such, only additional features or differences from FIGS. 2A-2E are described below. As seen in FIGS. 3A-3E, a low-emissivity (low-E) layer 370 in on the second pane 210. In one embodiment, the electrochemical device 260 and the low-E layer 370 are within a first cavity 255. In one embodiment, the electrochemical device 260 is on a first side of the first pane 205 that faces the low-E layer 370 located on an interior side of the second pane 210, where the first side is substantially parallel to the interior side. As seen in FIG. 3D, the active device 260 can include a low-emissivity (low-E) layer 272. In one embodiment, the second transparent conductive layer of the active device 260 can be a low-e layer 272. In such an embodiment, the low-E layer 370 can face the second transparent conductive layer of the active device 260 that can function as a low-e layer 272. In another embodiment, the low-e layer 370 has a length that is greater than a length of the low-e layer 272 of the active device 260.

FIGS. 4A-4E each illustrate a schematic view of a triple insulated glazing unit 400 according to another embodiment of the current disclosure. The triple glazing unit 400 of FIGS. 4A-4E are substantially similar to the triple glazing unit 200 of FIGS. 2A-2E. In fact, the triple glazing unit 400 of FIGS. 4A-4E are a variant of the embodiment of FIGS. 2A-2E, in which equivalent elements have been given identical reference numbers. As such, only additional features or differences from FIGS. 2A-2E are described below. As seen in FIGS. 4A-4E, a control layer 470 can be on the third pane 240. In one embodiment, the control layer 470 is on an interior surface of the third pane 240, where the interior surface is part of the boarder that creates the second cavity 265. In one embodiment, the insulated glazing unit 400 can optionally include a low-emissivity (low-E) layer 370 on the second pane 210. In one embodiment, the low-E layer 370 can be parallel to and face towards the control layer 470. In other words, the low-E layer 370 can be in the first cavity 255 and the control layer 470 can be in the second cavity 265. In another embodiment, the control layer 470 is the only layer within the cavity 265. The control layer 470 can have selectivity greater than 1.7 and less than 10. In one embodiment, the both the electrochemical device 260 and the low-E layer 370 are within the first cavity 255.

Figure 5:
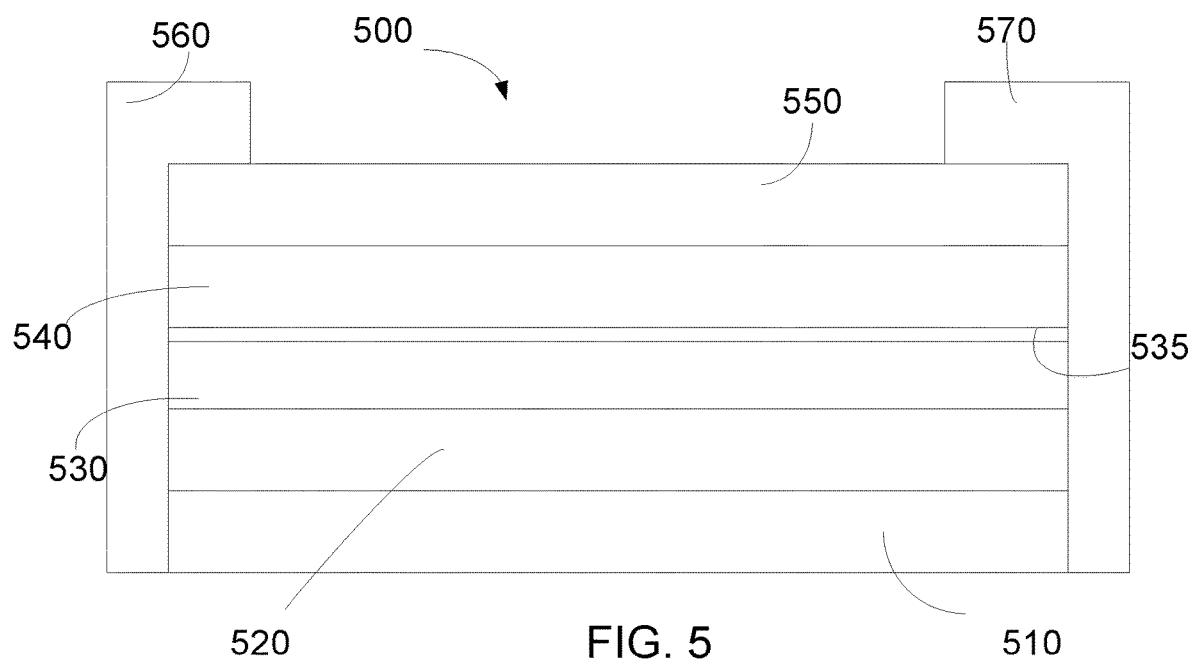
FIG. 5 is a schematic cross-section of an electrochemical device in accordance with another embodiment of the present disclosure.

FIG. 5 illustrates a cross-section view of an active device 500 that can be a part of the glazing units described above. In the embodiment of FIG. 5, the active device 500 is an electrochemical device 500. The electrochemical device 500 can include a substrate 510, a first transparent conductor layer 520, a cathodic electrochemical layer 530, an anodic electrochemical layer 540, and a second transparent conductor layer 550.

In an embodiment, the substrate 510 can include a glass substrate, a sapphire substrate, an aluminum oxynitride substrate, or a spinel substrate. In another embodiment, the substrate 510 can include a transparent polymer, such as a polyacrylic compound, a polyalkene, a polycarbonate, a polyester, a polyether, a polyethylene, a polyimide, a polysulfone, a polysulfide, a polyurethane, a polyvinylacetate, another suitable transparent polymer, or a co-polymer of the foregoing. The substrate 510 may or may not be flexible. In a particular embodiment, the substrate 510 can be float glass or a borosilicate glass and have a thickness in a range of 0.5 mm to 12 mm thick. The substrate 510 may have a thickness no greater than 16 mm, such as 12 mm, no greater than 10 mm, no greater than 8 mm, no greater than 6 mm, no greater than 5 mm, no greater than 3 mm, no greater than 2 mm, no greater than 1.5 mm, no greater than 1 mm, or no greater than 0.01 mm. In another particular embodiment, the substrate 510 can include ultra-thin glass that is a mineral glass having a thickness in a range of 50 microns to 300 microns. In a particular embodiment, the substrate 510 may be used for many different electrochemical devices being formed and may be referred to as a motherboard.

Transparent conductive layers 520 and 550 can include a conductive metal oxide or a conductive polymer. Examples can include a tin oxide or a zinc oxide, either of which can be doped with a trivalent element, such as Al, Ga, In, or the like, a fluorinated tin oxide, or a sulfonated polymer, such as polyaniline, polypyrrole, poly(3,4-ethylenedioxythiophene), or the like. In another embodiment, the transparent conductive layers 520 and 550 can include gold, silver, copper, nickel, aluminum, or any combination thereof. The transparent conductive layers 520 and 550 can include indium oxide, indium tin oxide, doped indium oxide, tin oxide, doped tin oxide, zinc oxide, doped zinc oxide, ruthenium oxide, doped ruthenium oxide and any combination thereof. The transparent conductive layers 520 and 550 can have the same or different compositions. The transparent conductive layers 520 and 550 can have a thickness between 10 nm and 600 nm. In one embodiment, the transparent conductive layers 520 and 550 can have a thickness between 200 nm and 500 nm. In one embodiment, the transparent conductive layers 520 and 550 can have a thickness between 320 nm and 460 nm. In one embodiment the first transparent conductive layer 520 can have a thickness between 10 nm and 600 nm. In one embodiment, the second transparent conductive layer 550 can have a thickness between 80 nm and 600 nm. The first transparent conductive layer 520 can be between the substrate 310 and the cathodic electrochemical layer 530. In one embodiment, the first transparent conductive layer 520 includes a P1 gap to prevent an electrical short of the electrochemical device 500. In one embodiment, the first transparent conductive layer 520 is electrically isolated from the second transparent conductive layer 550 through the P1 gap. In one embodiment, the second transparent conductive layer 550 of the device 260 can be a low-e layer.

The layers 530 and 540 can be electrode layers, wherein one of the layers may be a cathodic electrochemical layer, and the other of the layers may be an anodic electrochromic layer (also referred to as a counter electrode layer). In one embodiment, the cathodic electrochemical layer 530 is an electrochromic layer. The cathodic electrochemical layer 530 can include an inorganic metal oxide material, such as $WO_3$, $V_2O_5$, $MoO_3$, $Nb_2O_5$, $TiO_2$, $CuO$, $Ni_2O_3$, $NiO$, $Ir_2O_3$, $Cr_2O_3$, $CO_2O_3$, $Mn_2O_3$, mixed oxides (e.g., W—Mo oxide, W—V oxide), or any combination thereof and can have a thickness in a range of 40 nm to 600 nm. In one embodiment, the cathodic electrochemical layer 530 can have a thickness between 100 nm to 400 nm. In one embodiment, the cathodic electrochemical layer 530 can have a thickness between 350 nm to 390 nm. The cathodic electrochemical layer 530 can include lithium, aluminum, zirconium, phosphorus, nitrogen, fluorine, chlorine, bromine, iodine, astatine, boron; a borate with or without lithium; a tantalum oxide with or without lithium; a lanthanide-based material with or without lithium; another lithium-based ceramic material; or any combination thereof.

The anodic electrochromic layer 540 can include any of the materials listed with respect to the cathodic electrochromic layer 530 or $Ta_2O_5$, $ZrO_2$, $HfO_2$, $Sb_2O_3$, or any combination thereof, and may further include nickel oxide (NiO, $Ni_2O_3$, or combination of the two), and Li, Na, H, or another ion and have a thickness in a range of 40 nm to 500 nm. In one embodiment, the anodic electrochromic layer 540 can have a thickness between 150 nm to 300 nm. In one embodiment, the anodic electrochromic layer 540 can have a thickness between 250 nm to 290 nm. In some embodiments, lithium may be inserted into at least one of the first electrode 530 or second electrode 540.

In one embodiment, the device 500 may also include an ion conducting layer 535 between the cathodic electrochemical layer 530 and the anodic electrochemical layer 540. The ion conducting layer 535 may have a thickness between 1 nm and 20 nm. In one embodiment, the ion conducting layer 535 may have a thickness of no greater than 10 nm, such as no greater than 1 nm. The ion conducting layer 535 may contain material selected from the group consisting of lithium, sodium, oxidized lithium, $Li_2WO_4$, tungsten, nickel, lithium carbonate, lithium hydroxide, lithium peroxide, silicates, silicon oxides, tungsten oxides, tantalum oxides, niobium oxides, borates, aluminum oxides, lithium silicate, lithium aluminum silicate, lithium aluminum borate, lithium aluminum fluoride, lithium borate, lithium nitride, lithium zirconium silicate, lithium niobate, lithium borosilicate, lithium phophosilicate, other lithium-based ceramic materials, lithium salts, and dopants including lithium, sodium, hydrogen, deuterium, potassium, calcium, barium, strontium, magnesium, and a combinations thereof. In one embodiment, ion conducting layer 535 can be oxidized.

In another embodiment, the device 500 may include a plurality of layers between the substrate 510 and the first transparent conductive layer 520. In one embodiment, an antireflection layer is between the substrate 510 and the first transparent conductive layer 520. The antireflection layer can include $SiO_2$, $NbO_2$, and can be a thickness between 20 nm to 100 nm. The device 500 may include at least two bus bars. In the embodiment of FIG. 2, two bus bars 560, 570 are shown. In one embodiment, the bus bar 560 can be electrically connected to the first transparent conductive layer 520 and the bus bar 570 can be electrically connected to the second transparent conductive layer 550. In another embodiment, bus bar 560 and bus bar 570 can be electrically connected to the first transparent conductive layer 520 with additional bus bars (not shown) being connected to the second transparent conductive layer 550.

FIG. 6 illustrates a schematic view of a triple insulated glazing unit 600 according to another embodiment of the current disclosure. The triple glazing unit 600 of FIG. 6 is substantially similar to the triple glazing unit 400 of FIG. 4C. In fact, the triple glazing unit 600 of FIG. 6 is a variant of the embodiment of FIG. 4C, in which equivalent elements have been given identical reference numbers. As such, only additional features or differences from FIG. 6 are described below. As seen in FIG. 6, the internal or middle pane 605 can be a laminate that includes more than one substrate. The internal pane 605 can include a first internal pane 205, a substrate 225, a lamination layer 230 between the first internal pane 205 and the substrate 225, an active device 260 on the substrate 225, a second internal pane 606, and a second lamination layer 630 between the second internal pane 606 and the substrate 225. A low-emissivity (low-E) layer 272 can be on the second internal pane 606. Optionally, a control layer 470 can be on the second pane 210. In such an embodiment, the control layer 470 can be in the second cavity 265 while the low-E layer 672 is in a first cavity 255. The control layer 470 can have selectivity greater than 1.7 and less than 10. In one embodiment, an optional second low-E layer 270 can face the active device 260. In one embodiment, the second low-E layer 270 can be in the same cavity as the low-E layer 272. In one embodiment, the second transparent conductive layer of the active device 260 can be a low-e layer 272.

For purposes of illustrative clarity, the glazing unit 600 in FIG. 6 contains a san active device 260 between the internal pane 606 and the first pane 205. In one embodiment, the active device 260 can be a transparent/quasi transparent photovoltaic device, or more generally an energy harvesting device. In one embodiment, the active device 260 is an electrochemical device 260. In one embodiment, the electrochemical device 260 can be a variable transmission device. In one embodiment, the electrochemical device 260 can be an electrochromic device, such as the electrochromic device of FIG. 5. In one embodiment, the active device 260 is a thin film battery. In another embodiment, the active device 260 is a solid state electrochromic. In yet another embodiment, the active device 260 is a liquid crystal device that might contain dichroic dyes. The active device can also be a thermochromic or photochromic device. In one embodiment, the active device can be a sound emitting and/or sound cancelling device.

The embodiments described above and illustrated in the figures are not limited to rectangular shaped devices. Rather, the descriptions and figures are meant only to depict cross-sectional views of a device and are not meant to limit the shape of such a device in any manner. For example, the device may be formed in shapes other than rectangles (e.g., triangles, circles, arcuate structures, etc.). For further example, the device may be shaped three-dimensionally (e.g., convex, concave, etc.).

Many different aspects and embodiments are possible. Some of those aspects and embodiments are described below. After reading this specification, skilled artisans will appreciate that those aspects and embodiments are only illustrative and do not limit the scope of the present invention. Exemplary embodiments may be in accordance with any one or more of the ones as listed below.

Embodiment 1. A triple glazing unit can include a first pane; a second pane; a third pane between the first pane and the second pane; an active device coupled to the third pane and between the third pane and the second pane; a first cavity between the first pane and the third pane; and a second cavity between the second pane and the third pane, where the first cavity can include about 100% atmospheric air and the second space can include about 90% argon or krypton and 10% atmospheric air.

Embodiment 2. A triple glazing unit can include: a first pane; a second pane; a third pane between the first pane and the second pane; an active device coupled to the third pane and between the third pane and the second pane; a first spacer between the first pane and the third pane; and a second spacer between the second pane and the third pane, where a distance between the first pane and the third pane is smaller than a distance between the second pane and the third pane.

Embodiment 3. The triple glazing unit of embodiment 1 or embodiment 2, where a distance between the first pane and the third pane is smaller than a distance between the second pane and the third pane.

Embodiment 4. The triple glazing unit of embodiment 1 or embodiment 2, further can include a low-E layer on the second pane.

Embodiment 5. The triple glazing unit of embodiment 1, or embodiment 2, or embodiment 3, further can include a solar control layer on the first pane, where a selectivity of pane 1 is above 1.7.

Embodiment 6. The triple glazing unit of embodiment 5, where the emissivity of each face of pane 1 is above 0.5.

Embodiment 7. The triple glazing unit of embodiment 1 or embodiment 2, where the triple glazing unit has a solar heat gain coefficient in a clear state between 0.1 and 0.59.

Embodiment 8. The triple glazing unit of embodiment 1 or embodiment 2, where the triple glazing unit has a solar heat gain coefficient in a clear state between 0.2 and 0.4.

Embodiment 9. The triple glazing unit of embodiment 1 or embodiment 2, where the triple glazing unit has a solar heat gain coefficient in a tint state between 0.08 and 0.3.

Embodiment 10. The triple glazing unit of embodiment 1 or embodiment 2, where the triple glazing unit has a solar heat gain coefficient in a tint state between 0.08 and 0.2.

Embodiment 11. The triple glazing unit of embodiment 1 or embodiment 2, further can include a first spacer and a second spacer.

Embodiment 12. The triple glazing unit of embodiment 11, where the first spacer is between the first pane and the third pane.

Embodiment 13. The triple glazing unit of embodiment 11, where the second spacer is between the second pane and the third pane.

Embodiment 14. The triple glazing of embodiment 1 or embodiment 2, where one or more edges of the third pane are thermally treated, laser cut, grinded or polished to increase a resistance of the third pane to thermal breakage.

Embodiment 15. The triple glazing of embodiment 1 or embodiment 2, where the triple glazing unit can withstand external temperatures above 90° C.

Embodiment 16. The triple glazing unit of embodiment 1 or embodiment 2, where the active device is an electrochromic device.

Embodiment 17. The triple glazing unit of embodiment 13, where the electrochromic device includes: a first transparent conductive layer; a second transparent conductive layer; a cathodic electrochemical layer between the first transparent conductive layer and the second transparent conductive layer; and an anodic electrochemical layer between the first transparent conductive layer and the second transparent conductive layer.

Embodiment 18. The triple glazing unit of embodiment 17, where the electrochromic device further includes a substrate, where the first transparent conductive layer is on the substrate.

Embodiment 19. The triple glazing unit of embodiment 18, where the substrate includes glass, sapphire, aluminum oxynitride, spinel, polyacrylic compound, polyalkene, polycarbonate, polyester, polyether, polyethylene, polyimide, polysulfone, polysulfide, polyurethane, polyvinylacetate, another suitable transparent polymer, co-polymer of the foregoing, float glass, borosilicate glass, or any combination thereof.

Embodiment 20. The triple glazing unit of embodiment 17, where the cathodic electrochemical layer includes $WO_3$, $V_2O_5$, $MoO_3$, $Nb_2O_5$, $TiO_2$, CuO, $Ni_2O_3$, NiO, $Ir_2O_3$, $Cr_2O_3$, $Co_2O_3$, $Mn_2O_3$, mixed oxides (e.g., W—Mo oxide, W—V oxide), lithium, aluminum, zirconium, phosphorus, nitrogen, fluorine, chlorine, bromine, iodine, astatine, boron, a borate with or without lithium, a tantalum oxide with or without lithium, a lanthanide-based material with or without lithium, another lithium-based ceramic material, or any combination thereof.

Embodiment 21. The triple glazing unit of embodiment 17, further can include an ion-conducting layer between the cathodic electrochemical layer and the anodic electrochemical layer.

Embodiment 22. The triple glazing unit of embodiment 21, where the ion-conducting layer includes lithium, sodium, hydrogen, deuterium, potassium, calcium, barium, strontium, magnesium, oxidized lithium, Li2WO4, tungsten, nickel, lithium carbonate, lithium hydroxide, lithium peroxide, or an alkaline earth metal, transition metal, Zn, Ga, Ge, Al, Cd, In, Sn, Sb, Pb, Bi, B, Si, P, S, As, Se, Te, silicates, silicon oxides, tungsten oxides, tantalum oxides, niobium oxides, borates, aluminum oxides, lithium silicate, lithium aluminum silicate, lithium aluminum borate, lithium aluminum fluoride, lithium borate, lithium nitride, lithium zirconium silicate, lithium niobate, lithium borosilicate, lithium phophosilicate, other lithium-based ceramic materials, lithium salts, and dopants including lithium, sodium, hydrogen, deuterium, potassium, calcium, barium, strontium, magnesium, or combinations thereof.

Embodiment 23. The triple glazing unit of embodiment 17, where the second transparent conductive layer includes indium oxide, indium tin oxide, doped indium oxide, tin oxide, doped tin oxide, zinc oxide, doped zinc oxide, ruthenium oxide, doped ruthenium oxide and any combination thereof.

Embodiment 24. The triple glazing unit of embodiment 17, where the anodic electrochemical layer includes a an inorganic metal oxide electrochemically active material, such as $WO_3$, $V_2O_5$, $MoO_3$, $Nb_2O_5$, $TiO_2$, CuO, $Ir_2O_3$, $Cr_2O_3$, $Co_2O_3$, $Mn_2O_3$, $Ta_2O_5$, $ZrO_2$, $HfO_2$, $Sb_2O_3$, a lanthanide-based material with or without lithium, another lithium-based ceramic material, a nickel oxide (NiO, $Ni_2O_3$, or combination of the two), and Li, nitrogen, Na, H, or another ion, any halogen, or any combination thereof.

Embodiment 25. The triple glazing unit of embodiment 17, where the first transparent conductive layer includes indium oxide, indium tin oxide, doped indium oxide, tin oxide, doped tin oxide, zinc oxide, doped zinc oxide, ruthenium oxide, doped ruthenium oxide, silver, gold, copper, aluminum, and any combination thereof.

Embodiment 26. A process of manufacturing a triple glazing unit, the process can include: forming a double glazing unit in a first location, where the double glazing unit includes: a first pane; a second pane; a first spacer between the first pane and the second pane that forms a first cavity between the first pane and the second pane, where the first cavity includes about 90% argon or krypton and about 10% atmospheric air; and an active device coupled to the first pane, where the active device is between the first pane and the second pane; and forming a triple glazing unit in a second location, where the triple glazing unit includes: the double glazing unit formed under vacuum; a third pane; and a second spacer between the first pane and the third pane that forms a second cavity between the first pane and the third pane, where the second cavity includes about 100% atmospheric air.

Embodiment 27. The process of manufacturing a triple glazing unit of embodiment 26, where the second cavity is narrower than the first cavity.

Embodiment 28. The process of manufacturing a triple glazing unit of embodiment 26, where the second location is different from the first location.

EXAMPLE

An example is provided to demonstrate the performance of electrochemical devices located on an interior pane of a triple glazing unit according to the embodiments described above as compared to other electrochemical devices located on a triple glazing unit. For the various examples below, comparative sample 1 (S1) is understood to be an embodiment with equidistant spacing between each pane and the same gas filling each space of the triple glazing unit, an electrochromic device on an exterior pane and a low emissivity coating on the opposite exterior pane. Comparative sample 2 (S2) is understood to be an embodiment with equidistant spacing between each pane the same gas filling each space in the triple glazing unit, an electrochromic device on an interior pane, as described in EP Patent 19159556, and a low emissivity coating on one of the exterior panes. Sample 3 (S3) with was formed in accordance to the embodiment described above. Specifically, a triple glazing unit with an electrochromic device on an interior pane, variable spacing between panes, and variable gas filling each space of the triple glazing unit. Sample 4 (S4) with was formed in accordance with the embodiment described above. Specifically, a triple glazing unit with an electrochromic device on an interior pane, variable spacing between panes, variable gas filling each space of the triple glazing unit, and a low emissivity coating on an exterior pane. Sample 5 (S5) was formed in accordance with the embodiment described above. Specifically, a triple glazing unit with an electrochromic device on an interior pane, variable spacing between panes, variable gas filling each space of the triple glazing unit, a low emissivity coating on an interior pane and a solar control coating on the other exterior pane. Sample 6 (S6) was formed in accordance with the embodiment described above. Specifically, a triple glazing unit with an electrochromic device on an interior pane, variable spacing between panes, variable gas filling each space of the triple glazing unit, a low emissivity coating on an interior pane 1 and a solar control coating on the other exterior pane 2, where the emissivity of pane 2 is greater than 0.8 on both faces.

Table 1 is a table of comparative values of the various samples S1, S2, S3, S4 and S5.

TABLE 1

| Sample | Clear % T | Clear SHGC | Dark % T | Dark SHGC | Ug Value W/(m² K) |
|---|---|---|---|---|---|
| Sample 1 (S1) | 59% | 0.38 | 1% | 0.05 | 0.7 |
| Sample 2 (S2) | 61% | 0.5 | 1% | 0.28 | 0.7 |
| Sample 3 (S3) | 60% | 0.47 | 1% | 0.18 | 1.2 |
| Sample 4 (S4) | 61% | 0.45 | 1% | 0.14 | 0.9 |
| Sample 5 (S5) | 52% | 0.23 | 1% | 0.12 | 0.8 |
| Sample 6 (S6) | 52% | 0.22 | 1% | 0.08 | 1.0 |

S1 has a solar heat gain coefficient (SGHC) of 0.38 in the clear state and a SGHC of 0.05 in the tinted state. S2 has a solar heat gain coefficient (SGHC) of 0.61 in the clear state and a SGHC of 0.28 in the tinted state. S3 has a solar heat gain coefficient (SGHC) of 0.47 in the clear state and a SGHC of 0.18 in the tinted state. S4 has a solar heat gain coefficient (SGHC) of 0.45 in the clear state and a SGHC of 0.14 in the tinted state. S5 has a solar heat gain coefficient (SGHC) of 0.23 in the clear state and a SGHC of 0.12 in the tinted state. S6 has a solar heat gain coefficient (SGHC) of 0.22 in the clear state and a SGHC of 0.08 in the tinted state.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A triple glazing unit comprising:
    a first pane;
    a second pane;
    a third pane between the first pane and the second pane;
    an electrochromic device coupled to the third pane and between the third pane and the second pane;
    a first cavity between the first pane and the third pane; and
    a second cavity between the second pane and the third pane, wherein a size of the first cavity is different from a size of the second cavity, wherein the first cavity comprises about 100% atmospheric air and the second space comprises 90% argon or krypton and 10% atmospheric air, wherein the triple glazing unit has a solar heat gain coefficient in a clear state between 0.2 and 0.4.

2. The triple glazing unit of claim 1, wherein a distance between the first pane and the third pane is smaller than a distance between the second pane and the third pane.

3. The triple glazing unit of claim 1, further comprising a low-E layer on the second pane.

4. The triple glazing unit of claim 1, further comprising a solar control layer on the first pane, wherein a selectivity of pane 1 is above 1.7.

5. The triple glazing unit of claim 4, wherein the emissivity of each face of pane 1 is above 0.5.

6. A triple glazing unit comprising:
    a first pane;
    a second pane;
    a third pane between the first pane and the second pane;
    an electrochromic device coupled to the third pane and between the third pane and the second pane;
    a first spacer between the first pane and the third pane; and
    a second spacer between the second pane and the third pane, wherein a distance between the first pane and the third pane is smaller than a distance between the second pane and the third pane, wherein the triple glazing unit has a solar heat gain coefficient in a clear state between 0.2 and 0.4.

7. The triple glazing unit of claim 6, wherein the triple glazing unit has a solar heat gain coefficient in a clear state between 0.1 and 0.59.

8. The triple glazing unit of claim 6, further comprising a first spacer and a second spacer, wherein the first spacer is between the first pane and the third pane and wherein the second spacer is between the second pane and the third pane.

9. The triple glazing unit of claim 6, wherein one or more edges of the third pane are thermally treated, laser cut, grinded or polished to increase a resistance of the third pane to thermal breakage.

10. The triple glazing unit of claim 6, wherein the electrochromic device comprises:
    a first transparent conductive layer;
    a second transparent conductive layer;
    a cathodic electrochemical layer between the first transparent conductive layer and the second transparent conductive layer;
    an anodic electrochemical layer between the first transparent conductive layer and the second transparent conductive layer; and
    a substrate, wherein the first transparent conductive layer is on the substrate.

11. The triple glazing unit of claim 10, wherein the substrate comprises glass, sapphire, aluminum oxynitride, spinel, polyacrylic compound, polyalkene, polycarbonate, polyester, polyether, polyethylene, polyimide, polysulfone, polysulfide, polyurethane, polyvinylacetate, another suitable transparent polymer, co-polymer of the foregoing, float glass, borosilicate glass, or any combination thereof.

12. The triple glazing unit of claim 10, wherein the cathodic electrochemical layer comprises $WO_3$, $V_2O_5$, $MoO_3$, $Nb_2O_5$, $TiO_2$, CuO, $Ni_2O_3$, NiO, $Ir_2O_3$, $Cr_2O_3$, $Co_2O_3$, $Mn_2O_3$, mixed oxides, lithium, aluminum, zirconium, phosphorus, nitrogen, fluorine, chlorine, bromine, iodine, astatine, boron, a borate with or without lithium, a tantalum oxide with or without lithium, a lanthanide-based material with or without lithium, another lithium-based ceramic material, or any combination thereof.

13. The triple glazing unit of claim 10, further comprising an ion-conducting layer between the cathodic electrochemical layer and the anodic electrochemical layer.

14. The triple glazing unit of claim 13, wherein the ion-conducting layer comprises lithium, sodium, hydrogen, deuterium, potassium, calcium, barium, strontium, magnesium, oxidized lithium, $Li_2WO_4$, tungsten, nickel, lithium carbonate, lithium hydroxide, lithium peroxide, or an alkaline earth metal, transition metal, Zn, Ga, Ge, Al, Cd, In, Sn, Sb, Pb, Bi, B, Si, P, S, As, Se, Te, silicates, silicon oxides, tungsten oxides, tantalum oxides, niobium oxides, borates, aluminum oxides, lithium silicate, lithium aluminum silicate, lithium aluminum borate, lithium aluminum fluoride, lithium borate, lithium nitride, lithium zirconium silicate, lithium niobate, lithium borosilicate, lithium phophosilicate, other lithium-based ceramic materials, lithium salts, and dopants including lithium, sodium, hydrogen, deuterium, potassium, calcium, barium, strontium, magnesium, or combinations thereof.

15. The triple glazing unit of claim 10, wherein the second transparent conductive layer comprises indium oxide, indium tin oxide, doped indium oxide, tin oxide, doped tin oxide, zinc oxide, doped zinc oxide, ruthenium oxide, doped ruthenium oxide and any combination thereof.

16. The triple glazing unit of claim 10, wherein the anodic electrochemical layer comprises a an inorganic metal oxide electrochemically active material, such as $WO_3$, $V_2O_5$, $MoO_3$, $Nb_2O_5$, $TiO_2$, CuO, $Ir_2O_3$, $Cr_2O_3$, $Co_2O_3$, $Mn_2O_3$, $Ta_2O_5$, $ZrO_2$, $HfO_2$, $Sb_2O_3$, a lanthanide-based material with or without lithium, another lithium-based ceramic material, a nickel oxide (NiO, $Ni_2O_3$, or combination of the two), and Li, nitrogen, Na, H, or another ion, any halogen, or any combination thereof.

17. The triple glazing unit of claim 10, wherein the first transparent conductive layer comprises indium oxide, indium tin oxide, doped indium oxide, tin oxide, doped tin oxide, zinc oxide, doped zinc oxide, ruthenium oxide, doped ruthenium oxide, silver, gold, copper, aluminum, and any combination thereof.

18. A process of manufacturing a triple glazing unit, the process comprising:
   forming a double glazing unit in a first location, wherein the double glazing unit comprises:
      a first pane;
      a second pane;
      a first spacer between the first pane and the second pane that forms a first cavity between the first pane and the second pane, wherein the first cavity comprises about 90% argon or krypton and about 10% atmospheric air; and
      an active device coupled to the first pane, wherein the active device is between the first pane and the second pane; and
   forming a triple glazing unit in a second location, wherein the triple glazing unit comprises:
   the double glazing unit formed under vacuum;
   a third pane; and
   a second spacer between the first pane and the third pane that forms a second cavity between the first pane and the third pane, wherein the second cavity comprises about 100% atmospheric air, wherein the triple glazing unit has a solar heat gain coefficient in a clear state between 0.2 and 0.4.

19. The process of manufacturing a triple glazing unit of claim 18, wherein the second cavity is narrower than the first cavity.

* * * * *